(12) United States Patent
Saucedo

(10) Patent No.: US 9,491,578 B1
(45) Date of Patent: Nov. 8, 2016

(54) WIRELESS TRACKING DEVICE

(71) Applicant: Ivan Saucedo, Las Vegas, NV (US)

(72) Inventor: Ivan Saucedo, Las Vegas, NV (US)

( * ) Notice: Subject to any disclaimer, the term of this patent is extended or adjusted under 35 U.S.C. 154(b) by 0 days.

(21) Appl. No.: 14/731,571

(22) Filed: Jun. 5, 2015

(51) Int. Cl.
*H04W 4/02* (2009.01)
*H04M 1/725* (2006.01)
*H04W 4/22* (2009.01)

(52) U.S. Cl.
CPC ......... *H04W 4/022* (2013.01); *H04M 1/72541* (2013.01); *H04M 1/72572* (2013.01); *H04W 4/22* (2013.01)

(58) Field of Classification Search
CPC .............. G06F 1/163; G08B 21/0247; G08B 21/0277; G08B 21/24; A63B 2071/0663; A63B 2220/62; A63B 71/0622; A63B 71/0686; G01S 19/19; G04G 17/04; G04G 21/00; G04G 21/02; H04M 1/72572
See application file for complete search history.

(56) References Cited

U.S. PATENT DOCUMENTS

| 6,362,778 | B2 | 3/2002 | Neher |
| 7,682,069 | B2 | 3/2010 | Hyatt |

| 2003/0218539 | A1 | 11/2003 | Hight | |
| 2011/0007468 | A1* | 1/2011 | Burton | G04F 10/00 361/679.03 |
| 2012/0092822 | A1* | 4/2012 | Mooring | G04G 17/04 361/679.21 |
| 2013/0119255 | A1* | 5/2013 | Dickinson | G04G 21/00 250/340 |
| 2015/0358778 | A1* | 12/2015 | Heo | H04W 4/023 455/456.6 |

* cited by examiner

*Primary Examiner* — Nam Huynh
(74) *Attorney, Agent, or Firm* — Crossley & Stevenson Intellectual Property Law

(57) ABSTRACT

A wireless tracking device including a housing unit, a central processing unit disposed within the housing unit, a battery pack disposed within the housing unit, a GPS chip disposed within the housing unit, a light emitting diode disposed on a front surface of the housing unit, and a speaker disposed on the front surface of the housing unit. The central processing unit, the battery pack, the light emitting diode, the alarm, and the speaker are in operational communication with each other. The GPS chip is configured to transmit a signal to a tracking application of a receiver. The tracking application is configured to provide the geographical location of the housing unit to which the GPS unit is attached in real time.

6 Claims, 4 Drawing Sheets

WIRELESS TRACKING DEVICE

BACKGROUND OF THE INVENTION

Various types of tracking devices are known in the prior art. However, what has been needed is a wireless tracking device including a housing unit, a central processing unit disposed within the housing unit, a battery pack disposed within the housing unit, a global positioning system (hereinafter "GPS") chip disposed within the housing unit, a light emitting diode disposed on a front surface of the housing unit, a speaker disposed on a front surface of the housing unit. What has been further needed is for the tracking application to be configured to provide the geographical location of the housing unit to which the GPS unit is attached in real time. Lastly, what has been needed is for an alarm to be configured to sound through the speaker when a user is within a preselected geographical range of the tracking application. The wireless tracking device is portable, self-contained, and lightweight, allowing it to be stored within a limitless number of items including, but not limited to, personal belongings, pets, children, and motor vehicles. The device can optionally be disposed within an aperture that is disposed within a case on a watch. The wireless tracking device thus prevents an item from becoming lost or misplaced and helps to ensure that the missing item can be located quickly and safely. Additionally, the wireless tracking device enables the user to select a geographical range on the tracking application from which an alarm will sound on the device if the user travels into the predetermined area.

FIELD OF THE INVENTION

The present invention relates to tracking devices, and more particularly, to a wireless tracking device.

SUMMARY OF THE INVENTION

The general purpose of the present wireless tracking device, described subsequently in greater detail, is to provide a tracking chip which has many novel features that result in a wireless tracking device which is not anticipated, rendered obvious, suggested, or even implied by prior art, either alone or in combination thereof.

To accomplish this, the present wireless tracking device comprises a housing unit having a front surface and a back surface. A central processing unit is disposed within the housing unit. A battery pack is disposed within the housing unit. A GPS chip is disposed within the housing unit. A light emitting diode is disposed on the front surface of the housing unit. A speaker is disposed on the front surface of the housing unit. The GPS chip is configured to transmit a signal to a tracking application of a receiver. The receiver can optionally be a mobile device. The tracking application is configured to provide the geographical location of the housing unit to which the GPS unit is attached in real time. An alarm is configured to sound the speaker when a user is within a preselected geographical range of the tracking application. The central processing unit, the battery pack, the light emitting diode, the alarm, and the speaker are in operational communication with each other.

The wireless tracking device further comprises a watch having a case and a wristband, a plurality of a pair of eyelets, a first quick release buckle, a plurality of screws, and an aperture. The case has a display screen, a base, a top edge, and a bottom edge. The base has a top area and a bottom area. The display screen is removably and continuously disposed atop the base. The wristband has a first half and a second half. The wristband can optionally be silicone. Each of the first half and the second half has a right end and a left end. The right end of the first half of the wristband is attached to the top edge of the case. The left end of the first half of the wristband is attached to a double prong buckle. Each of the pair of eyelets is continuously and equidistantly disposed on the wristband. Each of the pair of eyelets disposed on the second half of the wristband is configured to engage the double prong buckle so that the user can securely fasten the wristband to his wrist. The first quick release buckle comprises a first female receptor and a first male quick release buckle. The first female receptor is disposed on the bottom edge of the case. The first male quick release buckle is attached to the left end of the second half of the wristband. The first female receptor and the first male quick release buckle are configured to slidingly engage with each other so that the user can securely fasten the wristband to his wrist. Each of the plurality of screws has a top side and a bottom side. The bottom side of each of the plurality of screws is continuously disposed through the case from the base to the display screen. The top side of each of the plurality of screws is disposed atop the display screen. The plurality of screws is configured to attach the display screen to the base. The aperture is disposed within the base from the top area to proximal the bottom area. A perimeter of the aperture substantially conforms to a perimeter of the housing unit. The housing unit is removably disposed within the aperture.

The wireless tracking device can optionally comprise an emergency control disposed on the base of the case. The emergency control is in operational communication with the alarm and the speaker. The emergency control is configured to activate the alarm through the speaker when a user depresses the emergency control.

The wireless tracking device can optionally comprise an extendable strap having a right side and a left side and a second quick release buckle. The extendable strap can optionally be silicone. The second quick release buckle comprises a second female receptor and a second male quick release buckle. The second female receptor is disposed on the right side of the extendable strap. The second male quick release buckle is disposed on the left side of the extendable strap. The second female receptor and the first male quick release buckle are configured to slidingly engage with each other. The second male quick release buckle and the first female receptor are configured to slidingly engage with each other.

Thus has been broadly outlined the more important features of the present wireless tracking device so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
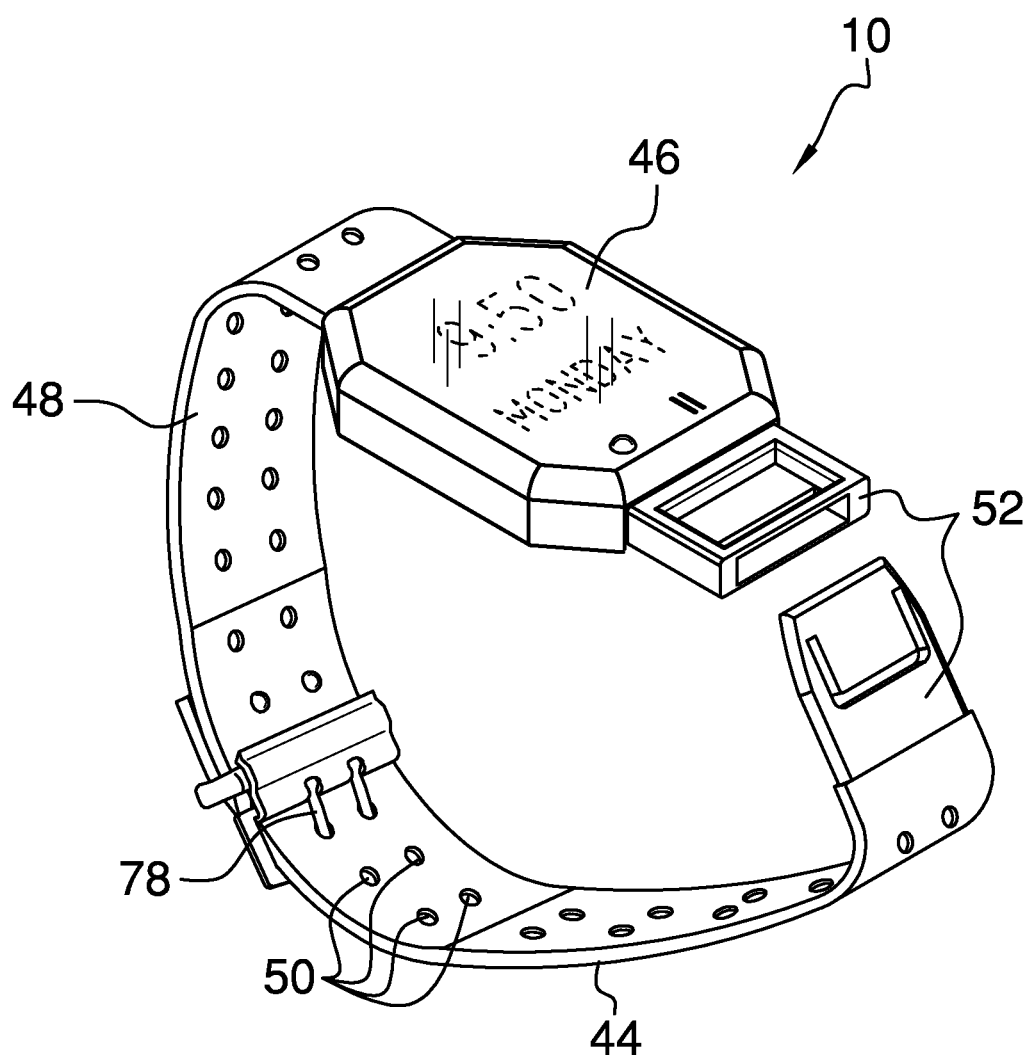
FIG. 1 is a front isometric view.

With reference now to the drawings, and in particular FIGS. 1 through 4 thereof, an example of the instant wireless tracking device employing the principles and concepts of the present wireless tracking device and generally designated by the reference number 10 will be described.

Referring to FIGS. 1 through 4 the present wireless tracking device 10 is illustrated. The wireless tracking device 10 comprises a housing unit 20 having a front surface 22 and a back surface 24. A central processing unit 26 is disposed within the housing unit 20. A battery pack 28 is disposed within the housing unit 20. A GPS chip 30 is disposed within the housing unit 20. A light emitting diode 32 is disposed on the front surface 22 of the housing unit 20. A speaker 34 is disposed on the front surface 22 of the housing unit 20.

Figure 2:
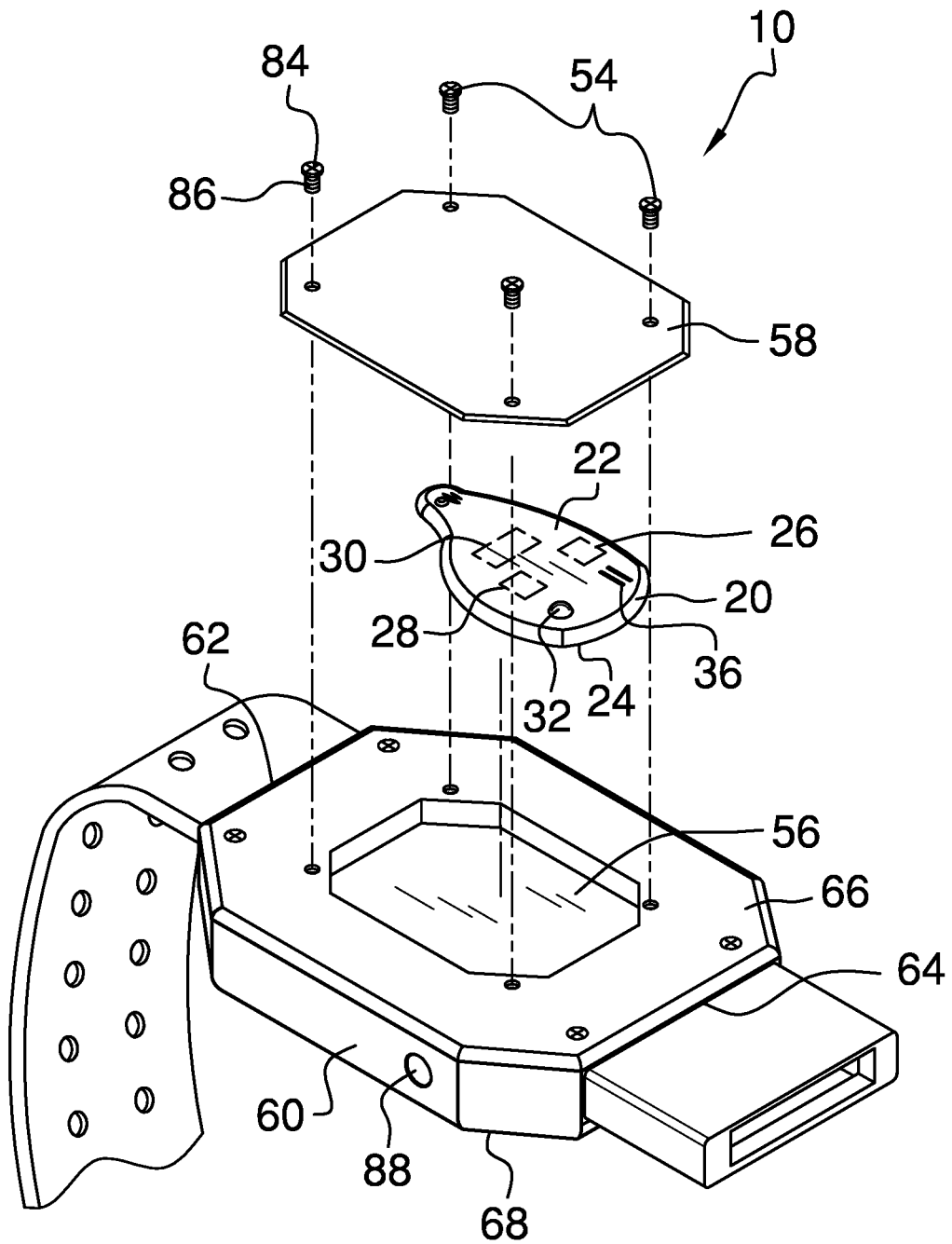
FIG. 2 is a rear exploded view.
Figure 3:
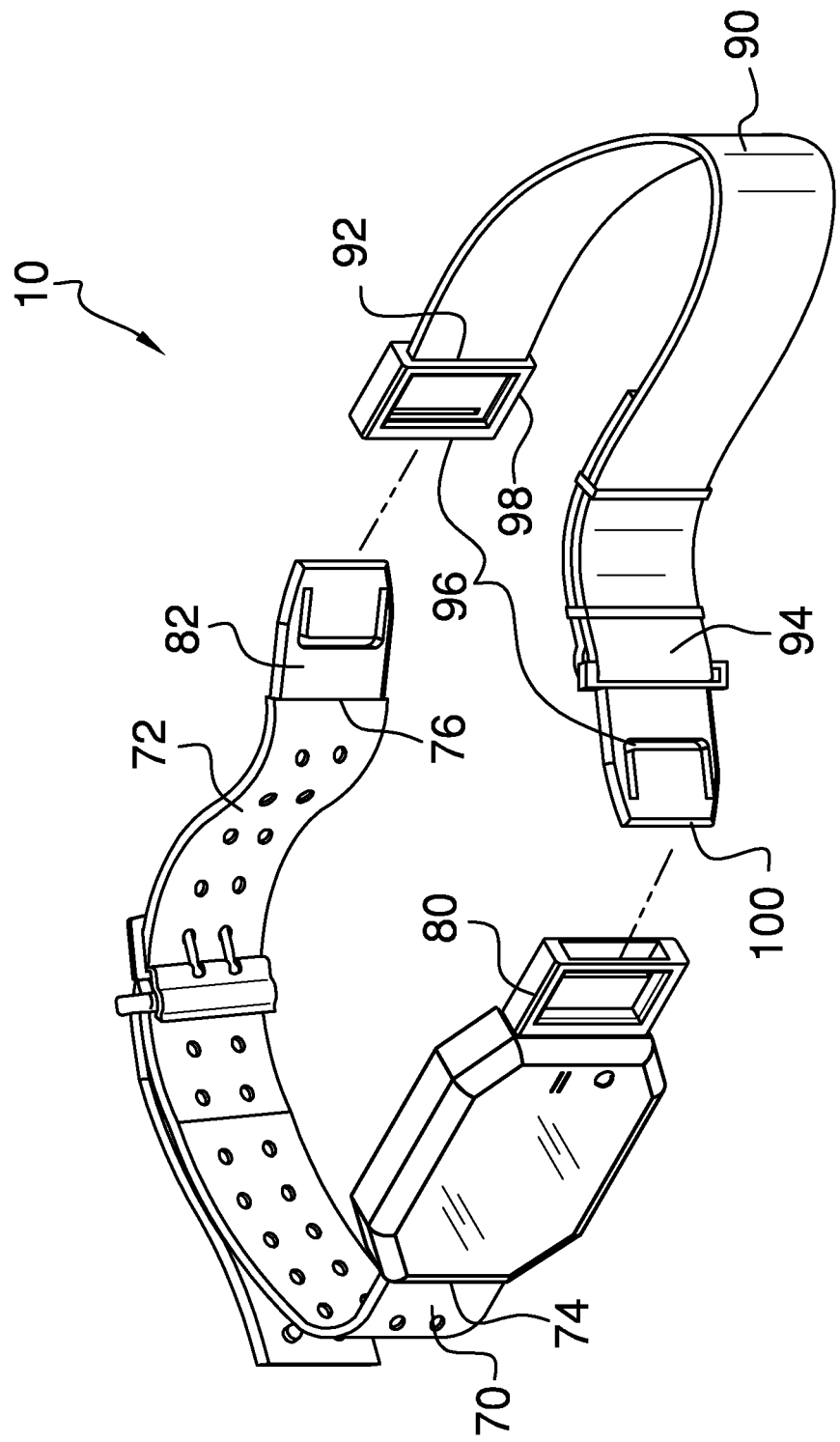
FIG. 3 is a front isometric view showing an extendable strap.
Figure 4:
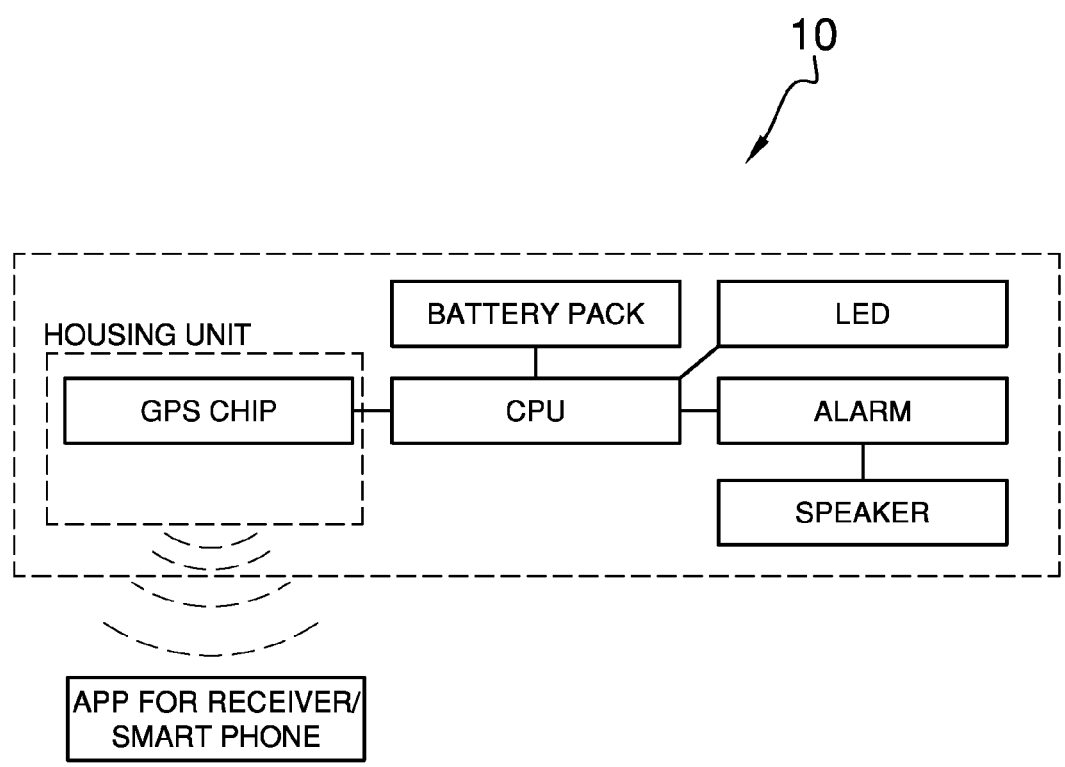
FIG. 4 is a block diagram showing the central processing unit, the battery pack, the light emitting diode, the alarm, and the speaker are in operational communication with each other.

The wireless tracking device 10 further comprises a watch 44 having a case 46 and a wristband 48, a plurality of a pair of eyelets 50, a first quick release buckle 52, a plurality of screws 54, and an aperture 56. The case 46 has a display screen 58, a base 60, a top edge 62, and a bottom edge 64. The base 60 has a top area 66 and a bottom area 68. The display screen 58 is removably and continuously disposed atop the base 60. The wristband 48 has a first half 70 and a second half 72. Each of the first half 70 and the second half 72 has a right end 74 and a left end 76. The right end 74 of the first half 70 of the wristband 48 is attached to the top edge 62 of the case 46. The left end 76 of the first half 70 of the wristband 48 is attached to a double prong buckle 78. The first quick release buckle 52 comprises a first female receptor 80 and a first male quick release buckle 82. The first female receptor 80 is disposed on the bottom edge 64 of the case 46. The first male quick release buckle 82 is attached to the left end 76 of the second half 72 of the wristband 48. Each of the plurality of screws 54 has a top side 84 and a bottom side 86. The bottom side 86 of each of the plurality of screws 54 is continuously disposed through the case 46 from the base 60 to the display screen 58. The top side 84 of each of the plurality of screws 54 is disposed atop the display screen 58. The aperture 56 is disposed within the base 60 from the top area 66 to proximal the bottom area 68. As best shown in FIG. 2, a perimeter of the aperture 56 substantially conforms to a perimeter of the housing unit 20. The housing unit 20 is removably disposed within the aperture 56.

The wireless tracking device 10 can optionally comprise an emergency control 88 disposed on the base 60 of the case 46. The emergency control 88 is in operational communication with the alarm 42 and the speaker 34.

The wireless tracking device 10 can optionally comprise an extendable strap 90 having a right side 92 and a left side 94 and a second quick release buckle 96. The second quick release buckle 96 comprises a second female receptor 98 and a second male quick release buckle 100. The second female receptor 98 is disposed on the right side 92 of the extendable strap 90. The second male quick release buckle 100 is disposed on the left side 94 of the extendable strap 90.

What is claimed is:

1. The A wireless tracking device comprising:
   a housing unit having a front surface and a back surface;
   a central processing unit disposed within the housing unit;
   a battery pack disposed within the housing unit;
   a GPS chip disposed within the housing unit;
   a light emitting diode disposed on the housing unit front surface;
   a speaker disposed on the housing unit front surface;
   wherein the GPS chip is configured to transmit a signal to a tracking application of a receiver;
   wherein the tracking application is configured to provide the geographical location of the housing unit to which the GPS unit is attached in real time;
   wherein an alarm is configured to sound through the speaker when a user is within a preselected geographical range of the tracking application;
   wherein the central processing unit, the battery pack, the light emitting diode, the alarm, and the speaker are in operational communication with each other;
   a watch having a case and a wristband, the case having a display screen, a base, a top edge, and a bottom edge, the base having a top area and a bottom area, the display screen removably and continuously disposed atop the base, the wristband having a first half and a second half, each of the first half and the second half having a right end and a left end, the first half right end attached to the case top edge, the first half left end attached to a double prong buckle;
   a plurality of a pair of eyelets, each of the pair of eyelets continuously and equidistantly disposed on the wristband;
   wherein each of the pair of eyelets disposed on the wristband second half is configured to engage the double prong buckle so that the user can securely fasten the wristband to his wrist;
   a first quick release buckle comprising a first female receptor and a first male quick release buckle, the first female receptor disposed on the case bottom edge, the first male quick release buckle attached to the second half left end;
   wherein the first female receptor and the first male quick release buckle are configured to slidingly engage with each other so that the user can securely fasten the wristband to his wrist;
   a plurality of screws, each of the plurality of screws having a top side and a bottom side, the bottom side of each of the plurality of screws continuously disposed through the case from the base to the display screen, the top side of each of the plurality of screws disposed atop the display screen;
   wherein the plurality of screws are configured to attach the display screen to the base;
   an aperture disposed within the base from the top area to proximal the bottom area;
   wherein a perimeter of the aperture substantially conforms to a perimeter of the housing unit;
   wherein the housing unit is removably disposed within the aperture, the display screen disposed atop the housing unit.

2. The wireless tracking device of claim 1 further comprising: an emergency control disposed on the case base, wherein the emergency control is in operational communication with the alarm and the speaker, the emergency control configured to activate the alarm through the speaker when a user depresses the emergency control.

3. The wireless tracking device of claim 2 further comprising:
   an extendable strap having a right side and a left side; and
   a second quick release buckle comprising a second female receptor and a second male quick release buckle, the second female receptor disposed on the extendable strap right side, the second male quick release buckle disposed on the extendable strap left side;

wherein the second female receptor and the first male quick release buckle are configured to slidingly engage with each other;

wherein the second male quick release buckle and the first female receptor are configured to slidingly engage with each other.

4. The wireless tracking device of claim 3 wherein the wristband is silicone.

5. The wireless tracking device of claim 4 wherein the extendable strap is silicone.

6. The wireless tracking device of claim 3 wherein the receiver is a mobile device.

* * * * *